United States Patent Office 3,629,360
Patented Dec. 21, 1971

3,629,360
COPOLYESTER/PHENOL-MODIFIED COUMA-
RONE-INDENE BLEND COMPOSITIONS
Dean C. Burkhart, Swarthmore, Lee R. Conrad, Springfield, and John B. Stokes III, Philadelphia, Pa., assignors to E. I. du Pont de Nemours and Company, Wilmington, Del.
No Drawing. Filed Apr. 25, 1969, Ser. No. 819,455
Int. Cl. C08g 31/04
U.S. Cl. 260—829
10 Claims

ABSTRACT OF THE DISCLOSURE

Blends of copolyester and phenol-modified coumarone-indene resins having about 20 to 85 percent by weight copolyester, based on total combined weight of copolyester and phenol-modified coumarone-indene, are provided for use as adhesive compositions, films, magnetic tape binders, staple cements and coatings.

BACKGROUND OF THE INVENTION (1) Field of the invention

This invention relates to modified copolyester compositions and more particularly to blends of copolyester resins and phenol-modified coumarone-indene type resins.

(2) Discussion of the prior art

Various copolyester products are well known in the adhesive art and in the field of extruded fibers and films. Certain types of terephthalic acid copolyesters have been found to have a balance of properties that make them particularly useful for laminating "Mylar"® polyester film to itself or to different substrates. Numerous useful copolyesters and methods for their preparation are described in U.S. Pats. 2,623,031 and 2,623,033, both issued Dec. 23, 1952 to Snyder.

Although the copolyester compositions described in the aforementioned patents are useful as adhesives which offer many desirable advantages over ordinary fusible resinous polyester adhesive compositions, there is a recognized need for new adhesive compositions having improved bond strengths at laminating temperatures below those necessary for existing polyester systems.

SUMMARY OF THE INVENTION

This invention concerns blend compositions of copolyester and phenol-modified coumarone-indene resins which exhibit unusually high bond strength when used as adhesives for laminates. These blend compositions contain about 20 to 85 percent by weight of a copolyester which results from the copolymerization of (a) at least one acyclic dicarboxylic acid of the formula:

HOOC—CH$_2$XCH$_2$—COOH wherein X is a chain composed of 4 to 10 atoms, in the chain of which not more than three atoms may be oxygen atoms while the remaining atoms are hydrocarbon carbon atoms, any two of such oxygen atoms being separated by at least two such carbon atoms, the hydrocarbon carbon atoms being saturated and containing a total of not more than three carbon atoms as side chain substituents, with (b) at least one aromatic dibasic acid selected from the group consisting of terephthalic acid, isophthalic acid, bibenzoic acid, ethylene bis-p-oxybenzoic acid and 2,6-naphthalic acid, and (c) a polymethylene glycol of the formula HO(CH$_2$)$_n$OH wherein $n$ is a whole number from 2 to 10 inclusive; and about 80 to 15 percent by weight of a phenol-modified coumarone-indene resin which results from the reaction of a phenol; and indene, coumarone and their homologs, in the presence of a boron trifluoride catalyst.

DESCRIPTION OF THE INVENTION

It has been found that certain blends of copolyesters and phenol-modified coumarone-indene resins, when used as laminating adhesives, exhibit unusually high bond strengths at laminating temperatures below those presently used for existing copolyester. These blended compositions also show markedly improved adhesive properties over either unblended coumarone-indene compositions or unblended copolyester compositions used individually. The blended adhesive compositions of this invention which have been found to possess a desirable balance of adhesive properties contain about 15 to 80 percent by weight copolyester, based on total combined weight of copolyester and coumarone-indene. However, blends having about 25 to 75 percent by weight copolyester have been shown to result in laminates having especially high bond strengths at low laminating temperatures. This effect is particularly evident when the blend compositions are used as general purpose laminating adhesives for bonding "Mylar"® polyester films, nylon films, metal foils and other types of commonly used laminating materials.

The copolyester component of the blend compositions of this invention are prepared by copolymerizing (1) at least one acyclic dicarboxylic acid having the formula: HOOC—CH$_2$XCH$_2$—COOH wherein X is a chain composed of 4 to 10 atoms, in the chain of which not more than three atoms may be oxygen atoms while the remaining atoms are hydrocarbon carbon atoms, any two such oxygen atoms being separated by at least two such carbon atoms, the hydrocarbon carbon atoms being saturated and containing a total of not more than three carbon atoms as side chain substituents, and (2) at least one aromatic dibasic acid selected from the group consisting of terephthalic acid, isophthalic acid, bibenzoic acid, ethylene bis-p-oxybenzoic acid, and 2,6-naphthalic acid with (3) a polymethylene glycol of the formula HO(CH$_2$)$_n$OH wherein $n$ is a whole number from 2 to 10 inclusive.

Instead of a polymethylene glycol alone, a mixed diol component composed of (1) a substantially water-insoluble polyoxyalkylene glycol consisting essentially of polytetramethylene ether glycol and (2) an alkanediol having the hydroxyl substituents thereof separated by a connecting carbon chain of 2 to 4 carbon atoms, can be used in place of the polymethylene glycol component (3).

Polytetramethylene ether glycol is represented by the formula: HO[CH$_2$CH$_2$CH$_2$CH$_2$O]$_n$—H where $n$ is an integer having a value of at least 2 and which ordinarily may be as high as 50. Normally the polytetramethylene ether glycol has a molecular weight of about 500 to 3000.

Although polytetramethylene ether glycol can be used alone, a minor proportion of another water-insoluble polyoxyalkylene glycol can be used in combination with the polytetramethylene ether glycol, the mixture containing at least 80 mole percent of polytetramethylene ether glycol. Polyoxyalkylene glycols of propylene glycol, 1,3-propanediol, 1,5-pentanediol and 1,6-hexanediol are typically useful water-insoluble species which can be mixed with polytetramethylene glycol.

Representative alkanediols used in formulating the copolyester component include, for example, ethylene glycol, propylene glycol, propanediol, 1,3-butylene glycol, 1,3-tetramethylene glycol and neopentyl glycol.

After formation of a copolymer in steps (1)–(3), the copolymer thus formed can be melt-blended with an aromatic polyester prepared by melt polymerizing an aromatic dibasic acid selected from the group consisting of terephthalic acid, isophthalic acid, bibenzoic acid, ethylene bis-p-oxybenzoic acid, tetramethylene bis-p-oxybenzoic acid, and 2,6-naphthalic acid and a polymethylene glycol of the formula

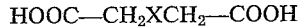

HO(CH$_2$)$_2$OH wherein $n$ is a whole number from 2 to 10 inclusive.

A more detailed description of the copolyester component of the blend compositions of this invention and methods for their preparation is contained in U.S. Patents 2,623,031 and 2,623,033, issued Dec. 23, 1952 to Snyder, and U.S. Patent 2,892,747, issued June 30, 1959 to Dye. Accordingly the disclosures of U.S. Patents 2,623,031, 2,623,033 and 2,892,747 are hereby incorporated by reference.

Representative acyclic dicarboxylic acids suitable for use in preparing the copolyester component include: adipic acid, pimelic acid, suberic acid, azelaic acid, sebacic acid, oxydibutyric acid, 5-oxa-1,10-decanedioic acid, undecanedioic acid, 4-n-propyl suberic acid, β-methyl-β'-ethyl suberic acid, 6,6-dimethyl undecane-1,11-dioic acid, oxydivaleric acid, 7-oxa-1,11-undecanedioic acid, dodecanedioic acid, 5-oxa-1,2-dodecanedioic acid, tridecanedioic acid, 5-oxa-1,13-tridecanedioic acid, 6-oxa-1,13-tridecanedioic acid, oxydicaproic acid, 5,8-dioxa-1,13-tridecanedioic acid, 5,9-dioxa-1,13-tridecanedioic acid and 3,6,9-trioxa-1,11-undecanedioic acid.

The amounts of aliphatic and aromatic acids used in preparing the copolyester component is desirably adjusted in such a fashion that the copolyester is not too crystalline to produce elastic films. A desired range of aromatic acid is about 30 to 60 percent by weight of total acid in the final polymer. Preferably 45 to 55 percent by weight aromatic acid is used to insure the desired elasticity. It is a simple matter to obtain any desired ratio of acid components in any one copolyester. The acids will be present in the final polymer in the same ratio as they were present in the initial reactants provided an excess of the glycol is used. It should be understood, of course, that many combinations of the aliphatic and aromatic acids can be used. Thus, two or more aliphatic and/or two or more aromatic acids can be used to form the copolyester. It is also to be understood that the ester-forming derivatives of these acids can be used in place of, and are the full equivalents of, the acids herein as is generally the case in the manufacture of linear polyesters.

Any conventional melt polymerization process can be used to make the copolyester component of this invention. Thus, copolyesters can be prepared in the melt by the action of a glycol on the dibasic acids or one of their ester-forming derivatives. For example, the dimethyl esters of the acids involved together with an excess of a polymethylene glycol can be initially heated together in the molten state and at atmospheric pressure. After the ester interchange is complete, as indicated by the cessation of the evolution of methanol, the pressure is gradually reduced to the vicinity of 0.5 millimeter of mercury and the temperature increased to a range of 240° C. to 280° C. These conditions are maintained for about 4 to 5 hours with stirring, at which time a polymer of the desired intrinsic viscosity is obtained. For good results, the aliphatic/aromatic copolyester should have an intrinsic viscosity on the order of 1.0 to 1.5 or above although copolyesters having intrinsic viscosities as low as 0.6 have been found to be useful for the purposes of this invention. The intrinsic viscosity values reflect the molecular weight range of 10,000 to 20,000 which is desired for the copolyesters.

The phenol-modified coumarone-indene component of this invention can be prepared by reacting coumarone, indene and their homologs with phenols in the presence of an organic complex of boron trifluoride. However, phenol-modified coumarone-indene resins suitable for use in this invention can also be prepared by other processes in which mixtures of phenols and naphthas containing coumarone and indene and their homologs as the principal polymerizable constituents are reacted in the presence of a catalyst, such as acid treated clay.

A desired process for preparing the phenol-modified coumarone-indene component involves (1) mixing a suitable phenol such as crude cresylic acid with a boron trifluoride complex such as boron trifluoride ethyl etherate and a suitable aromatic diluent, (2) heating the mixture to a temperature of about 50° C. to 105° C., (3) adding thereto indene, coumarone and their homologs and continuing the heating at a temperature of about 90° C. to 95° C. until no further reaction takes place as indicated by a constant specific gravity of the reaction mixture, (4) neutralizing the catalyst, for example, with a suitable clay, filtering, removing the solvent, removing the liquid polymer by steam or vacuum distillation condensation, and finally (5) recovering liquid polymer and solid resin.

Another process for producing the phenol-modified coumarone-indene component of this invention is carried out by forming a mixture of phenols and coumarone-indene and their homologs, heating the mixture to approximately 50° C. to 60° C., adding the BF$_3$ complex catalyst at a rate such that the increase in temperature which occurs does not substantially exceed 60° C. to 65° C., continuing the heating at a temperature of about 65° C. to about 105° C. until the reaction is complete as indicated by no substantial further increase in specific gravity of the reaction mixture, and recovering the products as described above.

A more detailed description of phenol-modified coumarone-indene resins and suitable methods for their preparation is contained in U.S. Patent 3,032,533, issued May 1, 1962 to Patterson et al. Accordingly, the entire disclosure of U.S. Patent 3,032,533 is hereby incorporated by reference.

The crude naphthas from which phenol-modified coumarone-indene type resins are prepared can be derived from a variety of sources such as from coal tar naphthas, naphtha fractions produced in the manufacture of gas from gas oil, etc., and from the severe cracking of petroleum oils, such as gas oil and the like. These naphthas may or may not contain minor percentages of phenols, say up to possibly 3% or 4%. They usually have a boiling range of from about 160° C. to 200° C., preferably about 165° C. to 190° C.

Usually the crude naphtha must pass a methanol dilution test which is made by thoroughly mixing 5 ml. of naphtha with 45 ml. of anhydrous methanol at room temperature. If any immediate cloud or haziness is observed, the naphtha cannot be used directly in this process. The materials causing cloudiness are removed, usually by redistillation. When the crude naphtha passes the methanol dilution test, a suitable inhibitor is at once added to prevent formation of polymerization or oxidation products during storage before use. Cresylic acids can be used as antioxidants in proportions up to say 0.5% to 2%. Other phenolic antioxidants can be used. The naphtha should be substantially anhydrous and should not contain tar bases in excess of about 0.005%. The tar bases can be removed by agitation with dilute sulfuric acid, for example, 10% by volume of 10% H$_2$SO$_4$. After the acid treatment, the naphtha can be washed with water and then dried by any suitable method such as by means of calcium chloride or other suitable dehydrating agent.

The source of phenols employed can vary, but they are normally a mixture of cresylic acids obtainable in commerce. Cresylic acids of the following characteristics have been used successfully:

| | Percent |
|---|---|
| Phenol | 0–19 |
| m- and p-cresol | 16–62.5 |
| O-cresol | 0–26 |
| Xylenols and higher | 18–82 |

These should contain not more than 0.05% by volume of water. If the cresylic acids, as received, contain water in excess of this it can be removed by azeotropic distillation, for example, with benzol, or by other suitable known methods. The tar base content of the cresylic acid should not be in excess of 0.10%. These can be removed by treatment with dilute acid solutions followed by water washing and drying.

The catalyst is prepared by mixing boron trifluoride with a suitable organic compound such as ethyl ether, methyl-ethyl ether, n- or iso propyl ether, acetic acid, propionic acid and the like in stoichiometric proportions. The catalyst also should be substantially anhydrous.

The proportions of the cresylic acids to the naphtha should be such that at the end of the reaction there is a small excess, for example, up to about 2% of the free phenols. The exact proportions will vary somewhat depending upon the polymerizable content of the coal tar or other indene-containing naphtha and is usually about 15% to 25% by volume of the naphtha. The resin forming constituents of the naphtha can vary from about 40% upward. The principal polymerizable constituent is indene (usually about 65% or more based on the polymerizables present) with minor amounts of coumarone and homologs of indene and coumarone. It is preferred to use naphthas having a polymerizable content in the neighborhood of about 60% or more, say 60% to 90% or more, and an indene content of at least 40% by volume.

The temperatures employed can be in the range of 50° C. to 110° C. These depend in part upon the particular manipulative procedure being used. In the first procedure described above, the temperatures preferably range from about 75° C. to about 90° C. It is preferred that the temperature be kept below about 80° C. to about 85° C. until all of the naphtha has been added, after which it is raised to about 90° C. to 95° C. to complete the reaction. In the second procedure described above the initial temperature is kept at about 25° C. to about 60° C., until all of the catalyst has been added, and then it is raised to about 65° C. to about 70° C. to complete the reaction.

The pressures employed are not critical, being merely sufficient to prevent loss by evaporation of the reactants and/or solvent. While superatmospheric pressure may be employed, normally the pressure is about that of the vapor pressure of the reaction mixture at the temperature employed.

A particularly preferred phenol-modified coumarone-indene resin is known as "Nevillac Soft"® and has a softening point of 76° C., a molecular weight of approximately 420, and a specific gravity at 25° C. (ASTM D–71–52) of 1.144.

After the copolyester and phenol-modified coumarone-indene components are prepared, specific portions of the components are blended. This blending can usually be accomplished by making up suitable solutions of each solid component and then mixing the solutions at room temperature. However, both solid components are sometimes placed in a common solvent and mixed under agitation at ambient temperature. When a solvent system is used which is not suitable for the copolyester component, both solid components are placed in a solvent, agitated and heated until the solids go into solution.

Moreover, the copolyester and phenol-modified coumarone-indene components can be hot melt blended by heating a mixture of the two components in any suitable pot until both components have melted. Normally the two components are stirred after melting to provide a uniform mixture of the blend composition. Temperatures between 220 and 250° C. at atmospheric pressure are normally required to melt both components in the hot melt blending process.

The copolyester/phenol-modified coumarone-indene blends of this invention are useful as adhesives for laminating various films used in the laminating industries. Such films include treated polyethylene, polypropylene, nylon, and "Mylar"® polyester films. In addition, these blend compositions can be used as magnetic tape binders, coatings, staple cements or as films.

It is interesting to note that phenol-modified coumarone-indene resins do not have adhesion to "Mylar"® polyester films when used by themselves. However, when blended with the copolyester described herein in the amounts specified, a new group of adhesives is made which have greater adhesive properties than the copolyester used alone.

The following examples further illustrate the preparation and use of the blend compositions of this invention. All parts and percentages are by weight unless otherwise specified.

Example 1.—A copolyester is formed by adding the following ingredients to a reaction vessel:

| | Parts by weight |
|---|---|
| Dimethyl terephthalate | 31.1 |
| Dimethyl azelate | 28.3 |
| Ethylene glycol | 40.6 |
| Total charge | 100.0 |

In addition to the above ingredients, 0.15 part of calcium acetate and 0.05 part of antimony trioxide based on polymer yield as catalysts for the ester-interchange and polycondensation reactions respectively.

In carrying out the copolymerization, the ingredients are charged into a reaction vessel provided with distillation and agitation means and blanketed with an atmosphere of nitrogen. The charge is heated at atmospheric pressure with moderate agitation until the pot temperature is 225° C. and the vapor temperature is about 190° C. indicating that the released methanol is exhausted. Heating is continued under reduced pressure (about 0.2 to 1 millimeter of mercury) at about 275° C. to remove excess ethylene glycol as a distillate, until the resulting copolyester had the desired viscosity, the copolyester formed has an inherent viscosity of about 0.75.

Next, 10 parts by weight of a commercially available phenol-modified coumarone-indene resins known as "Nevillac Soft"® is added to a container. Then 10 parts by weight of the copolyester and 80 parts by weight of 1,1,2-trichloroethane are added to the same container. The container is closed and then agitated on mixing rolls for 12 to 16 hours. After this agitation, the copolyester and phenol modified coumarone-indene resin are both in solution.

Next, laminates are prepared using the blended copolyester/phenol-modified coumarone-indene adhesive composition. These laminates are prepared by applying the adhesive using a wire wound rod at a dry film thickness of 0.2 to 0.4 mils to a 3 mil film of "Mylar"® polyester film. The adhesive coated "Mylar"® polyester film is air-dried for two minutes by heating the film in a 200° F. oven. The coated film is removed from the oven and allowed to cool. A laminate is formed by superimposing the adhesive-coated area of the film on an uncoated 3 mil film of "Mylar"® polyester. These films are then laminated on a Sentinal Heat Sealer at 300° F. and 20 p.s.i.g., with a 2 second dwell time. Finally the laminate is conditioned at 77° F. for 19 hours and cut into one inch strips for peel strength testing.

Two unbonded tongues (a long tongue and a short tongue) of each laminate specimen serve as gripping surfaces in carrying out the peel test. The long tongue of uncoated film is bent through 180° to provide thereby in combination with the short tongue a test specimen with gripping surfaces at opposite ends of the laminate. These opposing tongues are gripped in the jaws of an Instron tester, the portion of the specimen supported by the stationary jaw being backed by an iron bar to maintain the specimen in a vertical position, and the movable jaw is caused to separate from the stationary jaw at a rate of 12 inches per minute. By this action, the folded tongue is peeled from the laminate with peel strength measured in pounds per linear inch. Five samples of the laminate are tested and the reported results are averages of the five individual measurements.

A comparative laminate prepared by the above procedure but using only the copolyester is also tested. Comparative laminates are not prepared using the phenol-modified coumarone-indene as an adhesive because of its inability to satisfactorily bond to "Mylar"® polyester films.

Peel strength tests performed on laminates adhesively bonded with copolyester alone exhibit peel strengths of 4.7 ±0.4 lbs./linear inch while laminates bonded with the copolyester/phenol-modified coumarone-indene adhesive exhibit peel strengths of 7.0±0.4 lbs./linear inch.

Example 2.—The procedures of Example 1 are repeated except that a different copolyester formulation is used in place of the copolyester of Example 1.

| | Parts by weight |
|---|---|
| Dimethyl terephthalate | 18.6 |
| Dimethyl isophthalate | 9.6 |
| Dimethyl azelate | 31.4 |
| Ethylene glycol | 40.4 |
| Total charge | 100.0 |

Peel strength tests performed on "Mylar"® polyester laminates adhesively bonded with the copolyester alone and with copolyester/phenol-modified coumarone-indene adhesive show the following results:

| Adhesive: | Peel strength (lbs./linear inch) |
|---|---|
| Copolyester | 4.6±0.4 |
| Copolyester/phenol - modified coumarone-indene blend | 8.3±0.4 |

Examples 3–5.—The procedures of Example 1 are repeated except that different copolyester formulations are used in place of the copolyester of Example 1.

Example 3:

| | Parts by weight |
|---|---|
| Dimethyl terephthalate | 22.2 |
| Dimethyl isophthalate | 8.9 |
| Dimethyl sebacate | 15.9 |
| Ethylene glycol | 30.5 |
| Polytetramethylene ether glycol | 22.5 |
| Total charge | 100.0 |

Example 4:

| | |
|---|---|
| Dimethyl terephthalate | 30.5 |
| Diethyl sebacate | 29.6 |
| Ethylene glycol | 39.9 |

Example 5:

| | |
|---|---|
| Dimethyl terephthalate | 21.5 |
| Dimethyl isophthalate | 4.8 |
| Dimethyl azelate | 23.9 |
| 1,4-butanediol | 49.8 |

After blending the copolyester compositions of Examples 3–5 with the phenol-modified coumarone-indene component of Example 1, peel strength tests on laminates adhesively bonded with the blend compositions yield results similar to those obtained in Examples 1 and 2.

Example 6.—Ten parts by weight of the copolyester composition of Example 5 is hot melt blended with 10 parts by weight of the phenol-modified coumarone-indene composition of Example 1 by placing the two components in a pot and heating them until each has melted. The blend is then stirred to insure complete mixing of the two components. This blend composition is found to be very useful as a staple cement.

Example 7.—A copolyester composition is prepared according to the procedure of Example 1 except the following formulation is used instead of the formulation in Example 1:

| | Parts by weight |
|---|---|
| Dimethyl terephthalate | 30.5 |
| Dimethyl sebacate | 29.6 |
| Ethylene glycol | 39.9 |

The following materials are weighed into a three neck flask equipped with a thermometer, agitator and reflux condensers mounted on the respective necks:

| | Parts by weight |
|---|---|
| Dioxane | 40 |
| Methyl ethyl ketone | 40 |
| "Nevillac Soft"® phenol-modified coumarone-indene resin | 10 |
| Copolyester | 10 |

The mixture is then agitated and heated at reflux temperature for 4 hours at which time the solid ingredients go into solution. Surprisingly the copolyester also goes into solution in the presence of phenol-modified coumarone-indene resin, since under normal conditions the copolyester is insoluble in a dioxane-methyl ethyl ketone blend.

Laminates adhesively bonded with the blend composition generally have peel strengths similar to those obtained in Examples 1 and 2.

Example 8.—Examples 1–7 are repeated except that the copolyesters are blended with the phenol-modified coumarone-indene resins in amounts from 20 to 85 percent by weight copolyester, based on total combined weight of copolyester and phenol-modified coumarone-indene.

Laminates prepared from these blend compositions have results similar to those obtained in Examples 1 and 2.

What is claimed is:

1. A blend composition comprising about 20 to 85 percent by weight of a copolyester, having an inherent viscosity of at least about 0.6, which results from the copolymerization of (a) at least one acyclic dicarboxylic acid of the formula: HOOC—CH$_2$XCH$_2$—COOH wherein X is a chain composed of 4 to 10 atoms, in the chain of which not more than three atoms may be oxygen atoms while the remaining atoms are hydrocarbon carbon atoms, any two of such oxygen atoms being separated by at least two such carbon atoms, the hydrocarbon carbon atoms being saturated and containing a total of not more than three carbon atoms as side chain substituents, with (b) at least one aromatic dibasic acid selected from the group consisting of terephthalic acid, isophthalic acid, bibenzoic acid, ethylene bis-p-oxybenzoic acid and 2,6-naphthalic acid, and (c) a polymethylene glycol of the formula HO(CH$_2$)$_n$OH wherein $n$ is a whole number from 2 to 10 inclusive; and about 80 to 15 percent by weight of a phenol-modified coumarone-indene resin which results from the reaction of a phenol; and indene, coumarone and their homologs, in the presence of a boron trifluoride catalyst.

2. The blend composition of claim 1 wherein 25 to 75 percent by weight copolyester and 75 to 25 percent by weight of phenol-modified coumarone-indene resin are used.

3. The blend composition of claim 1 wherein the phenol is cresylic acid.

4. The blend composition of claim 3 wherein the reactants forming the copolyester are terephthalic acid, sebacic acid and ethylene glycol.

5. The blend composition of claim 3 wherein the reactants forming the copolyester are terephthalic acid, azelaic acid and ethylene glycol.

6. The blend composition of claim 3 wherein the reactants forming the copolyester are terephthalic acid, isophthalic acid, azelaic acid and ethylene glycol.

7. The blend composition of claim 3 wherein the reactants forming the copolyester are terephthalic acid, isophthalic acid, sebacic acid and a mixture of ethylene glycol and polytetramethylene ether glycol.

8. The blend composition of claim 3 wherein the reactants forming the copolyester are terephthalic acid, isophthalic acid, azelaic acid and 1,4-butane diol.

9. The blend composition of claim 3 in which component (c) of said copolyester comprises a mixed diol of a substantially water-insoluble polyoxyalkylene glycol consisting essentially of polytetramethylene ether glycol and an alkanediol having the hydroxyl substituents thereof separated by a connecting carbon chain of 2 to 4 carbon atoms.

10. A blend composition comprising (a) about 20 to 85 percent by weight of a copolyester, having an inherent viscosity of at least about 0.6, which results from the copolymerization of (1) at least one acyclic dicarboxylic acid of the formula: $HOOC-CH_2XCH_2-COOH$ wherein X is a chain composed of 4 to 10 atoms, in the chain of which not more than three atoms may be oxygen atoms while the remaining atoms are hydrocarbon carbon atoms, any two of which oxygen atoms being separated by at least two such carbon atoms, the hydrocarbon carbon atoms being saturated and containing a total of not more than three carbon atoms as side chain substituents, with (2) at least one aromatic dibasic acid selected from the group consisting of terephthalic acid, isophthalic acid, bibenzoic acid, ethylene bis-p-oxybenzoic acid and 2,6-naphthalic acid, and (3) a polymethylene glycol of the formula $HO(CH_2)_nOH$ wherein $n$ is a whole number from 2 to 10 inclusive; (b) about 80 to 15 percent by weight of a phenol modified coumarone-indene resin which results from the reaction of a phenol; and indene, coumarone and their homologs, in the presence of a boron trifluoride catalyst; and (c) a solvent for at least one of components (a) or (b).

References Cited
UNITED STATES PATENTS

| | | | |
|---|---|---|---|
| 2,446,581 | 8/1948 | Gold et al. | 260—829 |
| 2,725,309 | 11/1955 | Rodman | 260—829 |
| 3,294,862 | 12/1966 | Prochaska | 260—829 |

JOHN C. BLEUTGE, Primary Examiner

U.S. Cl. X.R.

117—161 K; 156—332; 161—214, 227, 231; 260—30.4 R, 32.8 R, 33.8 R